United States Patent
Oosaki

(10) Patent No.: US 8,019,128 B2
(45) Date of Patent: Sep. 13, 2011

(54) FACE DETECTION DEVICE

(75) Inventor: Masayoshi Oosaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 896 days.

(21) Appl. No.: 12/023,691

(22) Filed: Jan. 31, 2008

(65) Prior Publication Data

US 2008/0181468 A1 Jul. 31, 2008

(30) Foreign Application Priority Data

Jan. 31, 2007 (JP) ................................ 2007-022401

(51) Int. Cl.
*G06K 9/00* (2006.01)
(52) U.S. Cl. ........ 382/118; 382/282; 382/103; 382/254; 382/167; 382/164; 382/190; 382/284; 348/222.1; 348/223.1; 348/169; 348/129
(58) Field of Classification Search .................. 382/118, 382/282, 103, 254, 167, 164, 190, 284; 348/223.1, 348/222.1, 169, 129
See application file for complete search history.

(56) References Cited

U.S. PATENT DOCUMENTS

| | | | |
|---|---|---|---|
| 6,611,613 B1 | 8/2003 | Kang et al. | |
| 7,428,335 B2 | 9/2008 | Ida et al. | |
| 7,440,614 B2 | 10/2008 | Ida et al. | |
| 7,519,219 B2 | 4/2009 | Okamura | |
| 2001/0014182 A1* | 8/2001 | Funayama et al. | 382/282 |
| 2006/0035259 A1 | 2/2006 | Yokouchi et al. | |

FOREIGN PATENT DOCUMENTS

| | | |
|---|---|---|
| JP | H05-174149 A | 7/1993 |
| JP | 883341 A | 3/1996 |
| JP | H08-153197 A | 6/1996 |
| JP | 2001175869 A | 6/2001 |
| JP | 2001-188910 A | 7/2001 |
| JP | 2003150603 A | 5/2003 |
| JP | 2004-062721 A | 2/2004 |
| JP | 2004-110434 A | 4/2004 |
| JP | 2004-246593 A | 9/2004 |
| JP | 2005-056231 A | 3/2005 |
| JP | 2006-285944 A | 10/2006 |

OTHER PUBLICATIONS

Japan Patent Office, Office Action in Japanese Patent Application No. 2007-022401 (counterpart to the above-captioned U.S. Patent Application) mailed Feb. 24, 2009.

* cited by examiner

*Primary Examiner* — Matthew Bella
*Assistant Examiner* — Mike Rahmjoo
(74) *Attorney, Agent, or Firm* — Baker Botts L.L.P.

(57) ABSTRACT

The face detection device detects a human face image in an image. The face detection device includes a face determining unit, a control unit, a display unit, and a receiving unit. The face determining unit performs a face determination process in which the face determining unit determines whether the image includes a human face image indicative of at least a part of a human face. The control unit performs a base process by controlling the face determining unit to perform the face determination process at least one time. The display unit displays a result of the base process. When the receiving unit receives an instruction, the control unit performs an additional process by controlling the face determining unit to perform the face determination process at least one time on the same image with a higher accuracy than the face determination process in the base process.

12 Claims, 11 Drawing Sheets

FIG.7
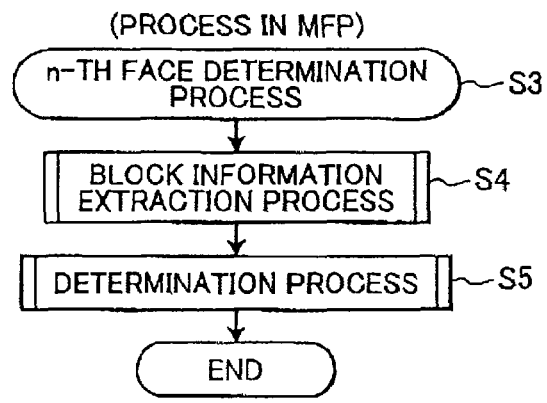
FIG.9(a)
SKIN-COLOR VALUE RANGES
$32 \leq L* \leq 92$
$10 \leq C* \leq 40$
$25 \leq h \leq 64$
FIG.9(b)
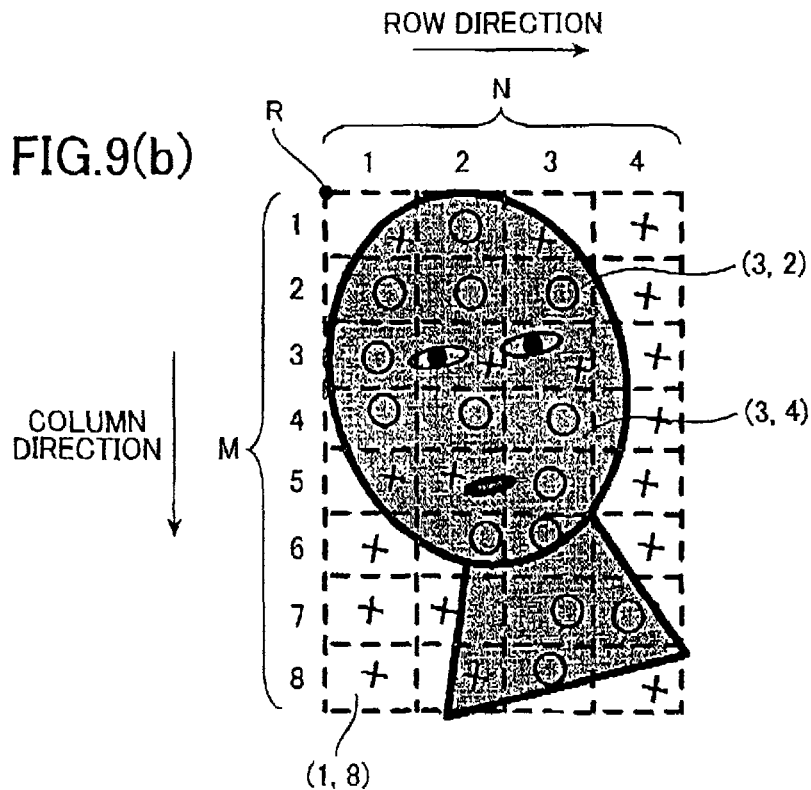

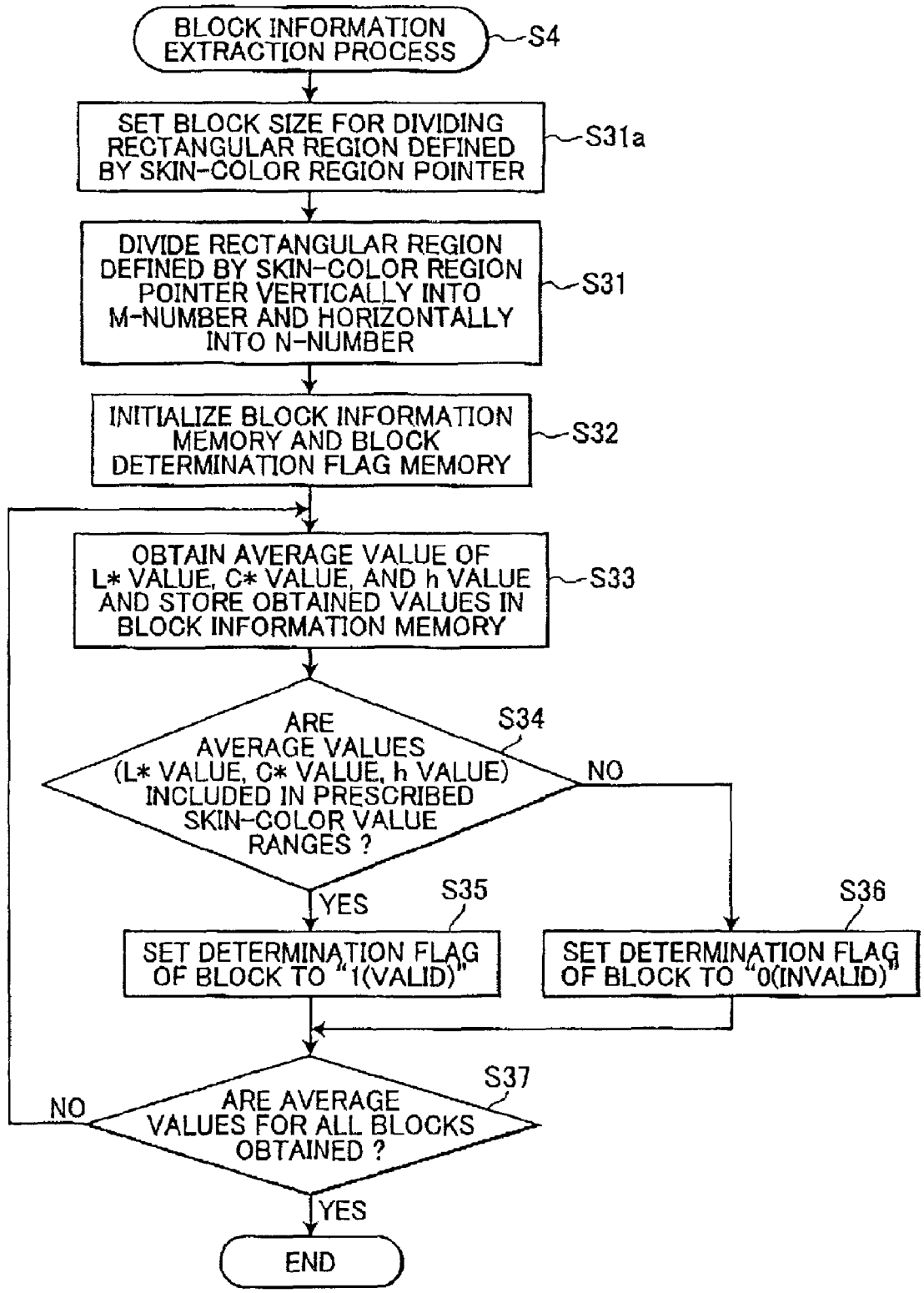

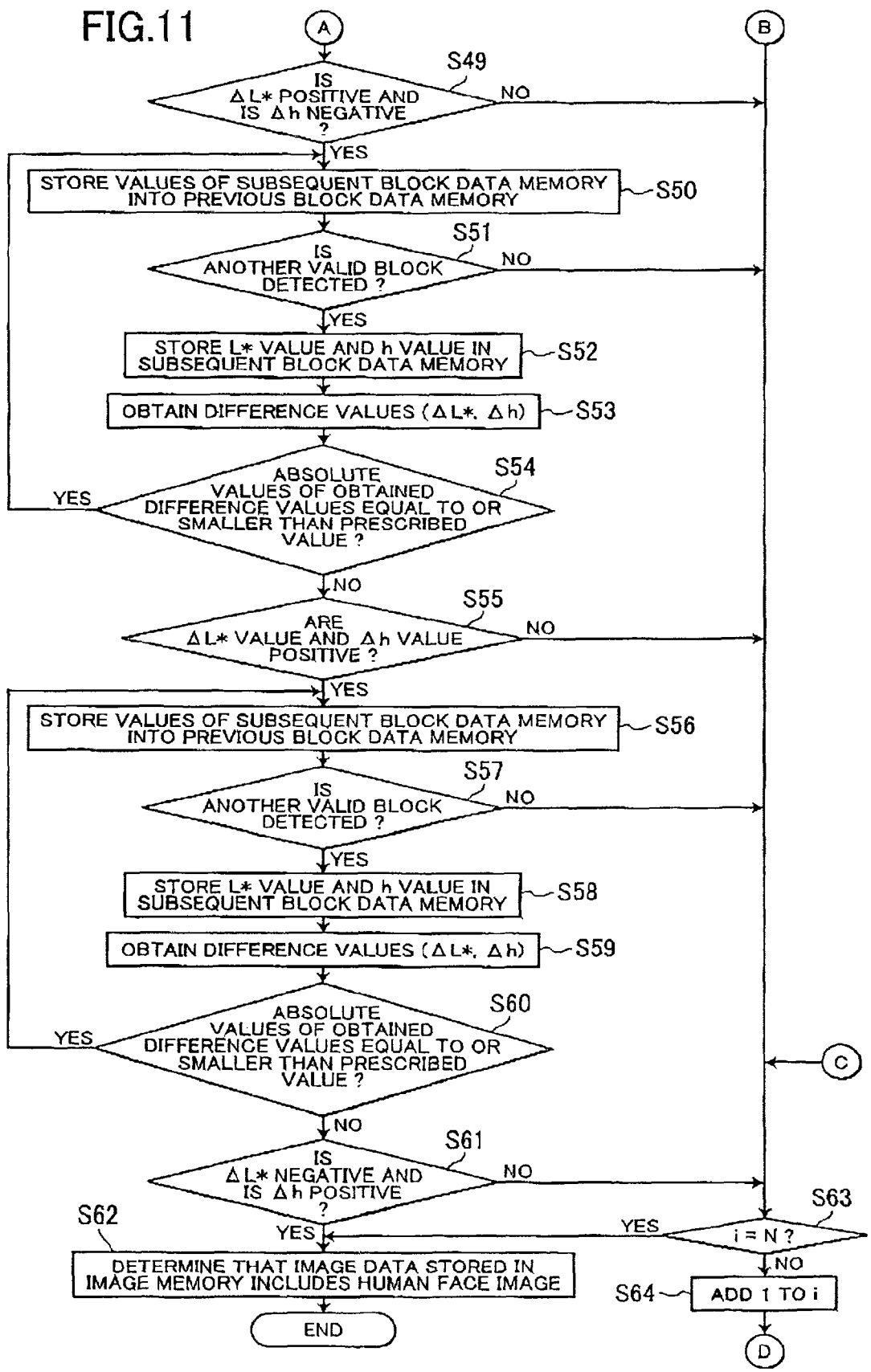

CHANGES IN SCANINNG DIRECTION

FACE DETECTION DEVICE

CROSS REFERENCE TO RELATED APPLICATION

This application claims priority from Japanese Patent Application No. 2007-022401 filed Jan. 31, 2007. The entire content of this priority application is incorporated herein by reference.

TECHNICAL FIELD

The present invention relates to a face detection device capable of detecting a human face image in an image, with a satisfactorily high accuracy, in a satisfactorily short time.

BACKGROUND

There has been known a face detection device for detecting a human face image in an image. Japanese Unexamined Patent Application Publication No. 2001-175869 (see paragraphs and) discloses a technique for determining whether or not given image data has a human face, by performing a plurality of processes on the image data such as edge extraction to detect the positions of the eyes, and to compare the image of the region surrounding the detected eyes, with a plurality of patterns preliminary registered. Each of the patterns typifies the region surrounding eyes.

SUMMARY

However, the technique disclosed in Japanese Unexamined Patent Application Publication No. 2001-175869 has a problem that a large number of patterns have to be registered to determine various types of human faces. The large number of registered patterns require a long time for comparing the images.

Both the detection accuracy on a human face image and the detection time thereon vary depending on the user. Even the same user may make various requests in terms of detection accuracy and time, according to time and circumstances. Although a human face image is detected with a high accuracy, the user is sometimes unsatisfied if a long time is required for the detection. On the other hand, although a human face image is detected within a short time, the user is sometimes unsatisfied if the accuracy is lower than the user's request.

The present invention is made in order to reduce the above problems, and it is an object of the present invention to provide a face detection device and a method capable of detecting a human face image in an image, with a satisfactorily high accuracy, in a satisfactorily short time.

In order to attain the above and other objects, the invention provides a face detection device. The face detection device detects a human face image in an image. The face detection device includes a face determining unit, a control unit, a display unit, and a receiving unit. The face determining unit performs a face determination process. In the face determination process the face determining unit determines whether the image includes a human face image indicative of at least a part of a human face. The control unit performs a base process by controlling the face determining unit to perform the face determination process at least one time. The display unit displays a result of the base process. The receiving unit is configured to receive an instruction indicating that an additional process is instructed by a user. When the receiving unit receives the instruction, the control unit performs the additional process by controlling the face determining unit to perform the face determination process at least one time on the same image with a higher accuracy than the face determination process in the base process.

According to another aspects, the invention provides a face detection method. The face detection method detects a human face image in an image. The face detection method includes performing a base process by performing the face determination process at least one time, the face determination process comprising determining whether the image includes a human face image indicative of at least a part of a human face, displaying a result of the performing of the base process, and receiving an instruction indicating an additional process is instructed by a user, after the receiving of the instruction, performing the additional process by performing the face determination process at least one time on the same image with a higher accuracy than the performing in the base process.

According to still another aspects, the invention provides a computer-readable storage medium. The computer-readable storage medium stores a set of program instructions executable on a face detection device. The program instructions includes performing a base process by performing the face determination process at least one time, the face determination process comprising determining whether the image includes a human face image indicative of at least a part of a human face, displaying a result of the performing of the base process, and receiving an instruction indicating an additional process is instructed by a user, after the receiving of the instruction, performing the additional process by performing the face determination process at least one time on the same image with a higher accuracy than the performing in the base process.

BRIEF DESCRIPTION OF THE DRAWINGS

In the drawings:

FIG. 7 is a flowchart showing an n-th face determination process;

FIG. 8 is a flowchart showing a block information extraction process;

FIG. 9(a) is a table showing a predetermined skin-color value range used in S14 of FIG. 4;

FIG. 9(b) conceptually illustrates a rectangular region, which is divided into a plurality of blocks, defined by a skin-color region pointer;

FIG. 11 is flowchart showing the other remaining part of the determination process;

DETAILED DESCRIPTION

Figure 1:
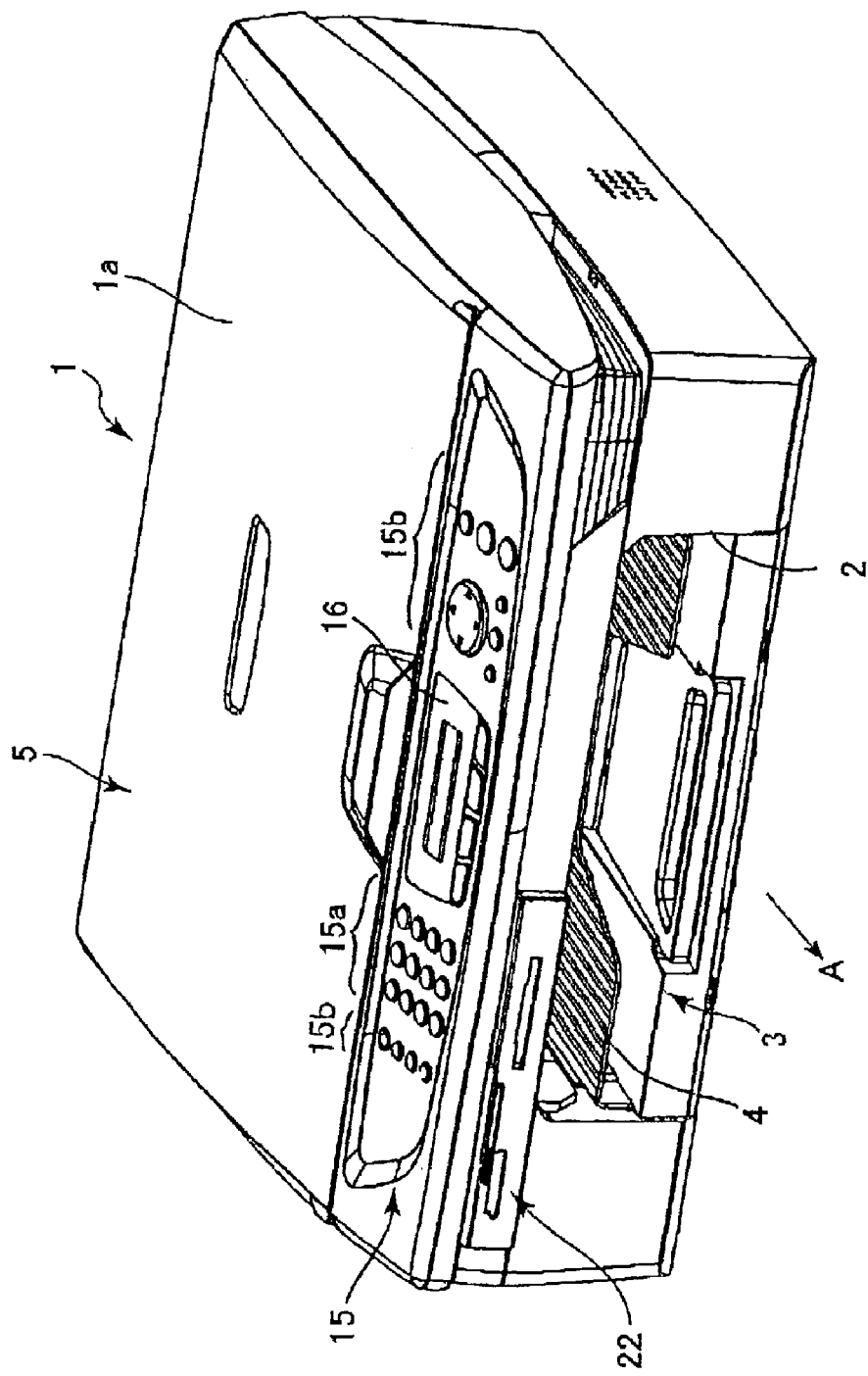
FIG. 1 is an external view showing the appearance of a multifunction peripheral.

The embodiment of the present invention is described with reference to the accompanying drawings. FIG. 1 is an external view showing the appearance of a multifunction peripheral (hereinafter, referred to as an "MFP") 1. The MFP 1 has various functions such as a printer function, a scanner function, and a copy function.

The MFP 1 has a main body 1a. The main body has an original document cover 5 on a top thereof and an opening 2 at the front thereof. The inside of the opening 2 is sectioned into upper and lower chambers. The lower chamber of the opening 2 encloses a sheet cassette 3 for holding a plurality of recording sheets in a stack manner. The upper chamber of the opening 2 has an output tray 4 for ejecting a printed recording sheet in a direction indicated by an arrow A.

Above the opening 2, an image reading apparatus (not shown) is provided to read an original document for scanning and copying. Below the original document cover 5, a glass table is provided to place an original document thereon. The document cover 5 includes operation keys 15 and an LCD 16 for displaying a menu, an operational procedure, or the progress of processing at the front side thereof. In order to read an original document, the original document cover 5 is opened in an upward direction, the original document is placed on the glass table, and then the original document cover 5 is closed to fix the original document. As an original document reading button of operation keys 15 is depressed, a scanner provided below the glass table, for reading the original document (for example, CIS. Contact Image Sensor) 20 (see FIG. 2), reads an image on the original document. The obtained image data is stored in a predetermined storage area of a RAM 13 to be described later (see FIG. 2).

The operation keys 15 include an input key group 15a for inputting a numeric value, a character, or the like, and a command input key group 15b for inputting various commands. The user depresses these operation keys 15 for turning on/off the power and switching between the functions. Since the LCD 16 displays the information corresponding to the depressed one of the operation keys 15, the user can check image data to be printed out, as well as various kinds of information on a printer 21 (see FIG. 2).

At the front of the opening 2, below the input key group 15a, a memory card slot 22 is provided to plug a portable flash memory card thereinto. The image data stored in the flash memory card can be printed by the printer function.

Figure 2:
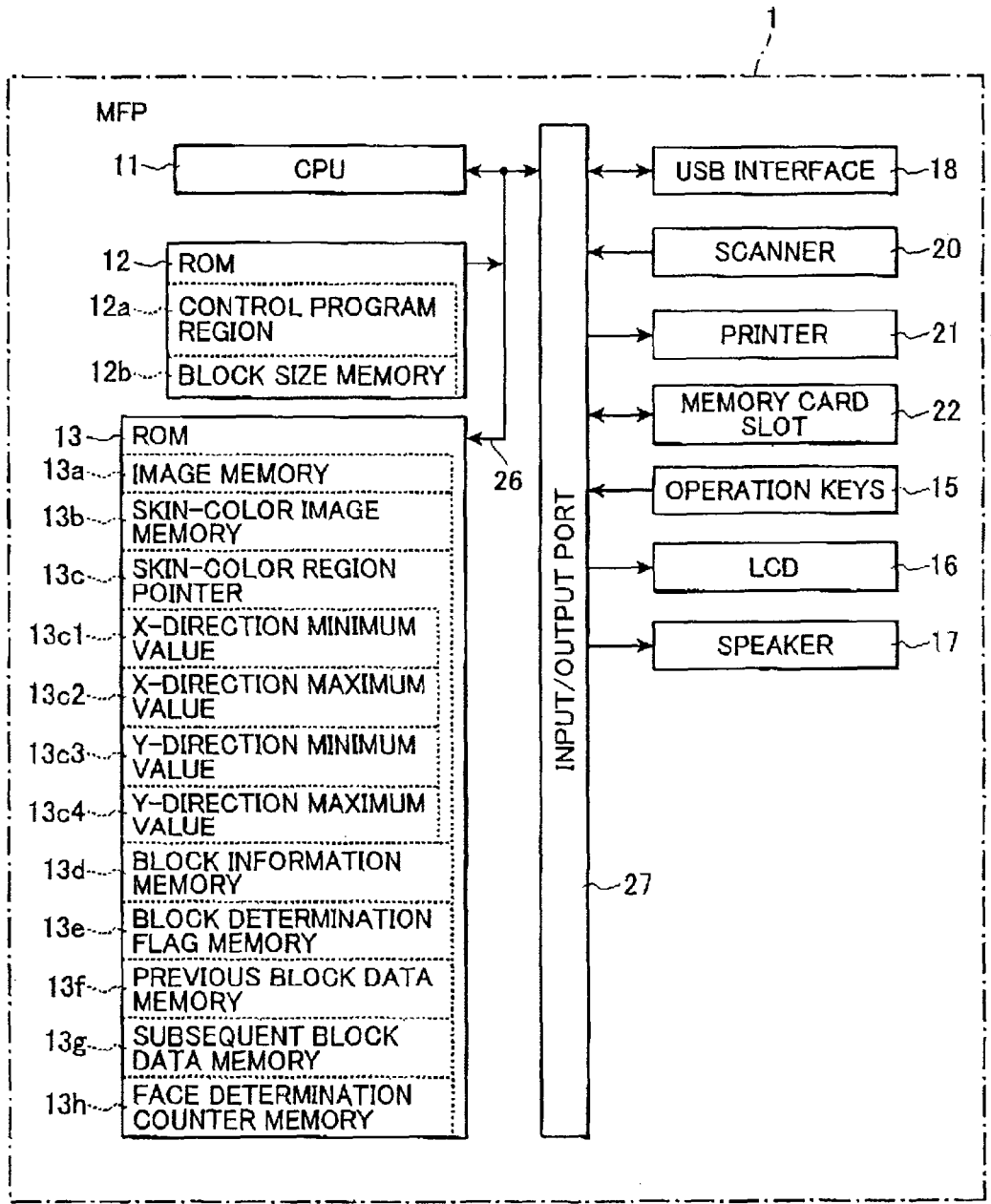
FIG. 2 is a block diagram showing the electrical configuration of the multifunction peripheral.

Referring next to FIG. 2, the electrical configuration of the MFP 1 is described. FIG. 2 is a block diagram showing the electrical configuration of the MFP 1. The MFP 1 includes a CPU 11, a ROM 12, the RAM 13, the operation keys 15, the LCD 16, a speaker 17, a USB interface 18, the scanner 20, the printer 21, and the memory card slot 22. The CPU 11, the ROM 12, and the RAM 13 are connected to each other via a bus line 26. Furthermore, the operation keys 15, the LCD 16, the speaker 17, the USB interface 18, the scanner 20, the printer 21, the memory card slot 22, and the bus line 26 are connected to each other via an input/output port.

The CPU 11 controls each of the components connected to the input/output port 27, according to the fixed value or the program stored in the ROM 12 or the RAM 13, the control instructions provided by the MFP for each function, or the various signals communicated via the USB interface 18. The ROM 12 is an unrewritable memory. The ROM 12 includes a control program region 12a for storing various control programs to be executed in the MFP 1, and a block size memory 12b.

The control program region 12a stores, for example, programs for performing the processes shown in the flowcharts of FIGS. 3-5, 7, 8, 10, and 11. The control program region 12a further stores correction programs, such as a red-eye correction program and skin-color correction program, by which the CPU 11 corrects a face image.

The block size memory 12b stores a table showing the size of one block. The block size varies according to the value on a face determination counter n to be described later. In a block information extraction process shown in the flowchart of FIG. 8, a skin-color region is extracted from an image which presumably contains a human face. The skin-color region is divided into the blocks, the block size is set based on the table of the block size memory 12b. When the block information extraction process is performed repeatedly, the face determination counter n is increased. The block size becomes smaller as the value on the face determination counter n becomes larger.

The RAM 13 is a rewritable memory for temporarily storing various kinds of data. The RAM 13 includes an image memory 13a, a skin-color image memory 13b, a skin-color region pointer 13c, a block information memory 13d, a block determination flag memory 13e, a previous block data memory 13f, a subsequent block data memory 13g, and a face determination counter memory 13h.

The image memory 13a is a region for inputting RGB bitmap image data (hereinafter, referred to as "bitmap data") loaded from a personal computer or a memory card. The bitmap data is stored in the known bitmap format for forming an image by arranging pixels in a grid pattern. In the bitmap format, the values representing each color are stored for each pixel. The inputted bitmap data is converted from the RGB system to the L*C*h system, and then stored in the skin-color image memory 13b.

A description is now given for the L*C*h system. The L*C*h system is the color system employed in the embodiment. In this system, "L*" indicates lightness; "C*" indicates chroma; and "h" indicates hue.

The skin-color image memory 13b is for storing L*C*h bitmap data for pixels having human skin characteristics extracted from the inputted image data.

The skin-color region pointer 13c has an X-direction minimum value 13c1, an X-direction maximum value 13c2, a Y-direction minimum value 13c3, and a Y-direction maximum value 13c4. The skin-color region pointer 13c is for storing position information of a rectangular region which encloses the periphery of pixels having the human skin characteristics (see FIG. 6(c)) in the image data stored in the skin-color image memory 13b.

The block information memory 13d stores average values (hereinafter, referred to as "block values") of values stored in the image data stored in the skin-color image memory 13b for those pixels contained in each of a plurality of blocks into which the rectangular region defined by the skin-color region pointer 13c is divided. Here, the block has a predetermined size (see FIG. 9(b)).

The block determination flag memory 13e stores a block determination flag corresponding to each block whose block information is stored in the block information memory 13d. The block determination flag is set to "1" when the block value has the human skin characteristics. The block determination flag is set to "0" when the block value has no human skin characteristics.

Figure 12A:
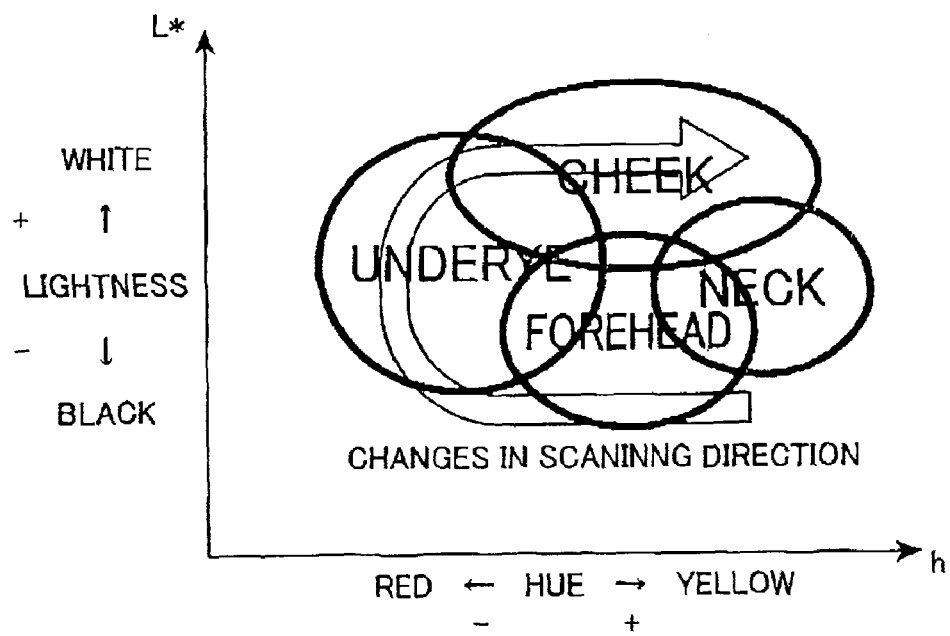
FIG. 12(a) briefly illustrates the determination process (S5)
Figure 12B:
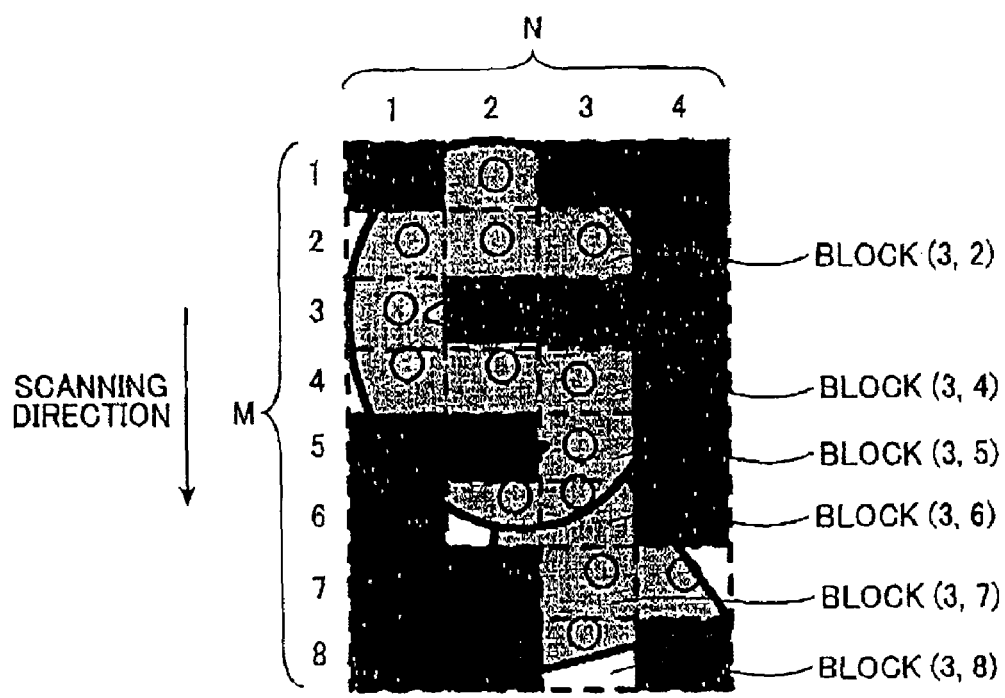
FIG. 12(b) shows a region divided into a plurality of blocks.

The previous block data memory 13f stores one of the block values stored in the block information memory 13d. The subsequent block data memory 13g stores one of the block values stored in the block information memory 13d. The previous block data memory 13f and the subsequent block data memory 13g are used to obtain difference values. In this case, the previous block data memory 13f and the subsequent block data memory 13g are described with reference to FIG. 12(b). FIG. 12(b) shows a region which is divided into eight blocks in a vertical direction and four blocks in a horizontal direction. Each block has block value. The blocks with "0" are scanned on a column basis. That is, the block with "0" on the first column are scanned from the first to eighth rows in a scanning direction (column direction). Next, the blocks with "0" on the second column are scanned from the first to eighth rows in the column direction. Other blocks on subsequent columns are scanned in the same manner.

While scanning from the first row in a scanning direction, a block value detected first is stored in the previous block data memory 13f and a block value detected next is stored in the subsequent block data memory 13g. The value of the previous block data memory 13f is subtracted from the value of the subsequent block data memory 13g to obtain a difference value between the block values. As the difference value is obtained, the value of the subsequent block data memory 13g is stored in the previous block data memory 13f. As scanning is then continued in the scanning direction, the block value detected next is stored in the subsequent block data memory 13g and a difference value is similarly obtained.

The face determination counter memory 13h stores the face image counter n. The face determination counter n is a counter that counts number of the n-th face determination process (S3) shown in the flowchart of FIG. 3. The face determination counter 13n therefore indicates the number of times the face determination process (S3) has been executed. The user decides whether or not to perform the next face determination process. If the user decides to perform the next face determination process, one is added to a current value of the face determination counter n.

The speaker 17 makes an operation sound when each of the operation keys 15 is depressed. The speaker 17 makes an alarm sound when an error occurs. The printer 21, although not shown, is composed of an inkjet printer. For color printing, the printer 21 includes a print head which uses the four color inks of C (cyan), M (magenta), Y (yellow), and K (black), a sheet feeder, and a recovery apparatus.

Figure 3:
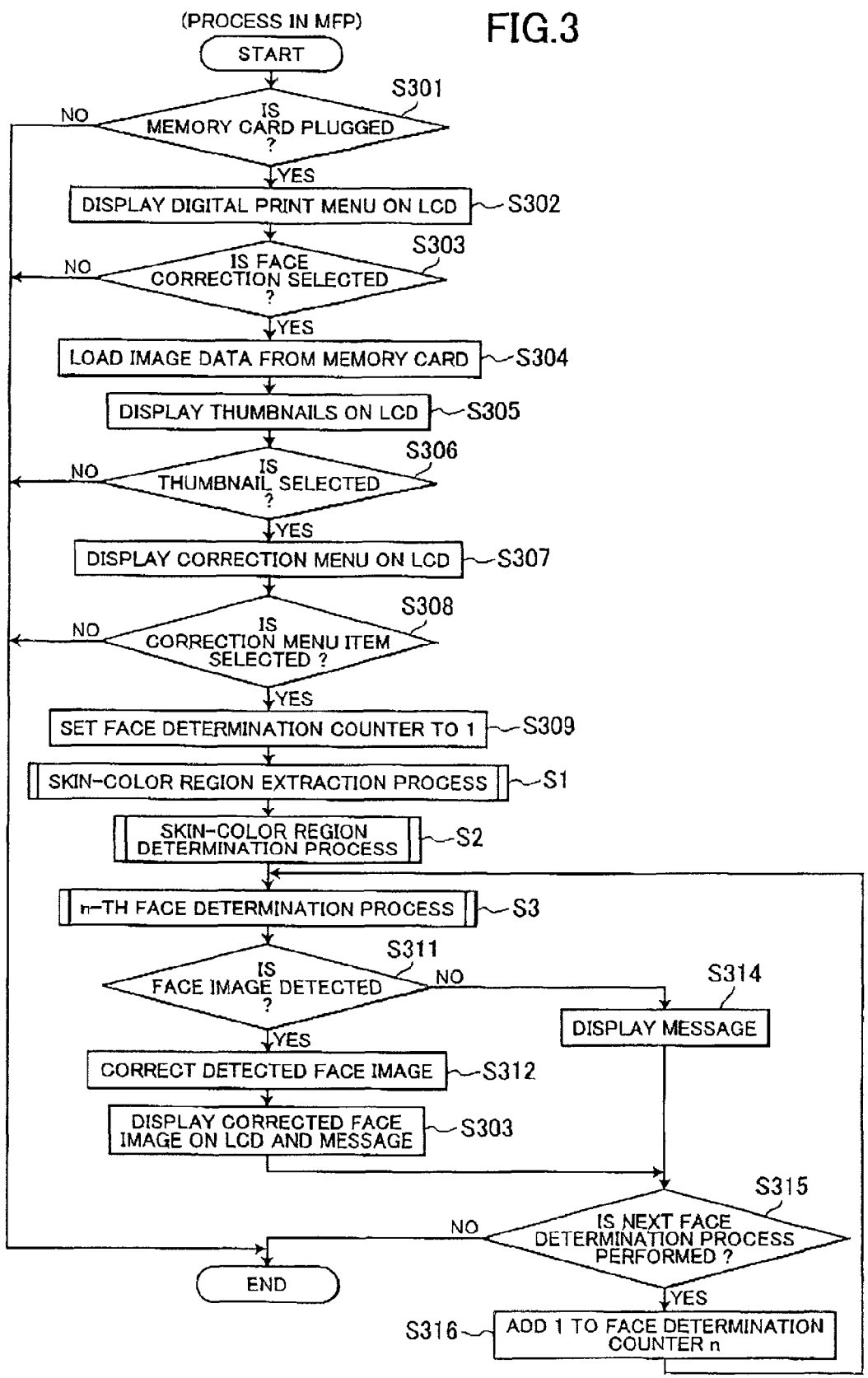
FIG. 3 is a flowchart showing a face correction process.

FIG. 3 is a flowchart showing a face correction process. In the face correction process, a human face image is detected in an image specified by the user and a correction requested by the user is then performed on the detected face image. The face correction process is performed by the CPU 11.

In the face correction process, first, in S301, the CPU 11 determines whether or not the memory card has been plugged into the memory card slot 22. If the memory card has been plugged (S301: Yes), in S302 the CPU 11 controls the LCD 16 to display a digital camera print menu. In S303 the CPU 11 determines whether or not the user selects a face correction from the digital camera print menu. If the face correction is selected (S303: Yes), in S304 the CPU 11 loads the image data stored in the memory card. In S305 the CPU 11 controls the LCD 16 to display the thumbnails of the loaded images. Here, the image data loaded from the memory card is stored in the image memory 13a.

In S306 the CPU 11 determines whether or not the user selects one of the thumbnails displayed on the LCD 16 as an image to perform the face correction process. If the user selects one of the thumbnails as an image to perform the face correction process (S306: Yes), the CPU 11 controls the LCD 16 to display a face correction menu (S307). The face correction menu displays menu items such as a red-eye correction menu item and a skin-color correction menu item which indicates names of the correction program, a red-eye correction program and skin-color correction program respectively, stored in the control program region 12a.

Next, in S308 the CPU 11 determines whether or not the user selects a menu item for a prescribed correction method from the face correction menu. If the prescribed menu item is selected (S308: Yes), in S309 the CPU 11 sets the face determination counter n to "1".

If a memory card is not plugged into the memory card slot 22 (S301: No), if the user does not select the face correction (S303: No), if the user does not selects a thumbnail to perform the face correction process (S306: No), or if the prescribed menu item is not selected (S308; No), the CPU 11 ends the process.

When in S309 the CPU 11 sets the face determination counter n to "1", in S1 the CPU 11 proceeds to a skin-color region extraction process.

The skin-color region extraction process (S1) is described with reference to a flowchart of FIG. 4. In the skin-color region extraction process, in S11, the CPU 11 initializes the skin-color image memory 13b. That is, in this initialization, the CPU 11 sets the values of all the pixels (L*value, C*value, h value) to white (100, 0, 0).

Next, in S12 the CPU 11 converts the image data stored in the image memory 13a from the RGB system to the L*C*h system, and then copies the converted image data in the skin-color image memory 13b. In S13 the CPU 11 reads the values (L* value, C* value, h value) of one pixel from the skin-color image memory 13b. In S14 the CPU 11 determines whether or not each of the pixel values (the read L* value, C* value, and h value) for one pixel is included in a corresponding predetermined skin-color value range. As shown in FIG. 9(a), in the embodiment, the predetermined skin-color value ranges are defined as follows: $32 \leq L^* \leq 92$; $10 \leq C^* \leq 40$; and $25 \leq h \leq 64$.

If all the read pixel values (L* value, C* value, and h value) for the subject pixel are included in the predetermined skin-color value range (S14: Yes), the CPU 11 proceeds to S16 without changing the pixel values for the pixel. On the other hand, if any of the read pixel values (L*, C*, h) for the pixel are not included in the predetermined skin-color value range (S14: No), in S15 the CPU 11 sets the pixel values read from the skin-color image memory 13b to values indicating white. In S16 the CPU 11 determines whether or not pixel values for all pixels are read from the skin-color image memory 13b. If the pixel values for all pixels are read from the skin-color image memory 13b (S16: Yes), the CPU 11 ends the process. On the other hand, if pixel values for all pixels are not read from the skin-color image memory 13b (S16: No), the CPU 11 returns to S13 for repeating the processes S13 to S15.

Figure 4:
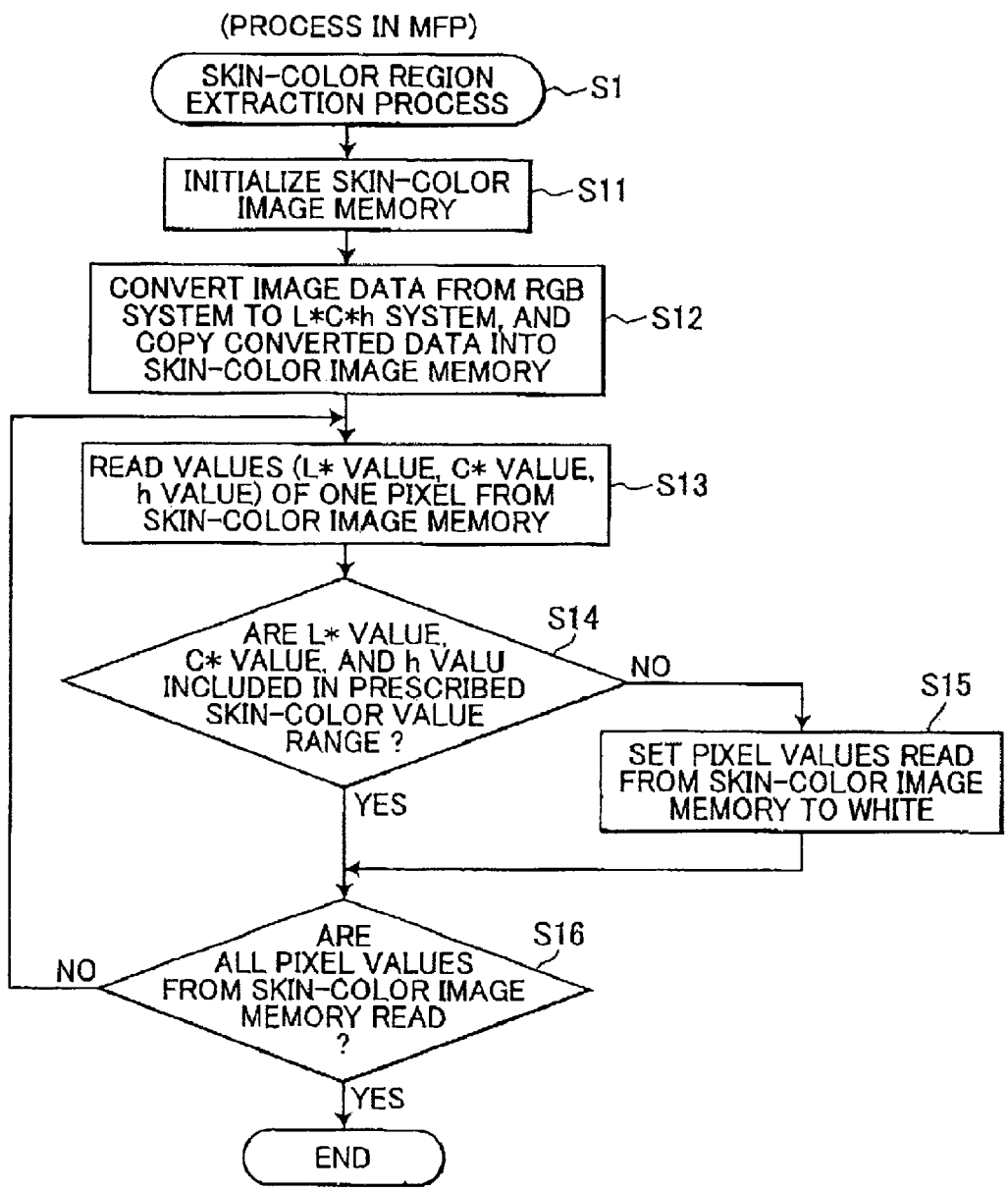
FIG. 4 is a flowchart showing a skin-color region extraction process.
Figure 6A:
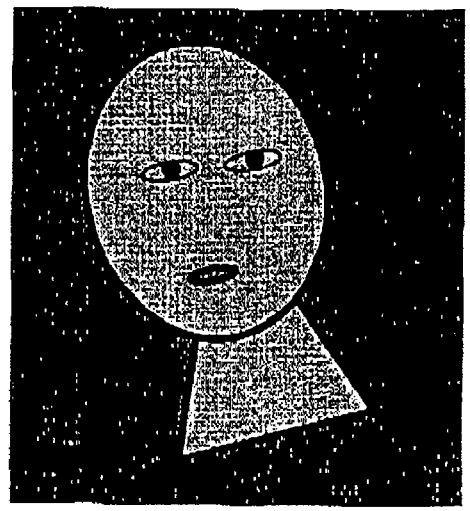
FIGS. 6(a)-6(c) illustrate the skin-color region extraction process.
Figure 6B:
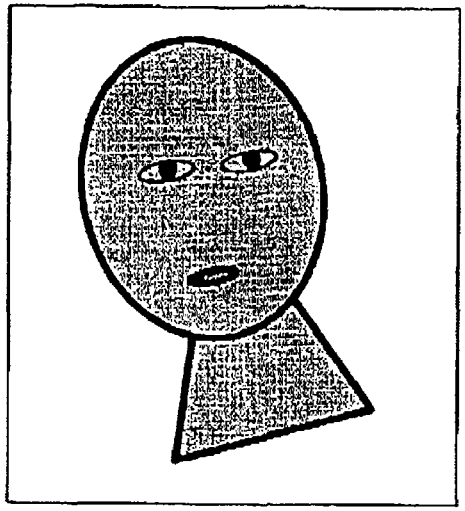
Figure 6C:
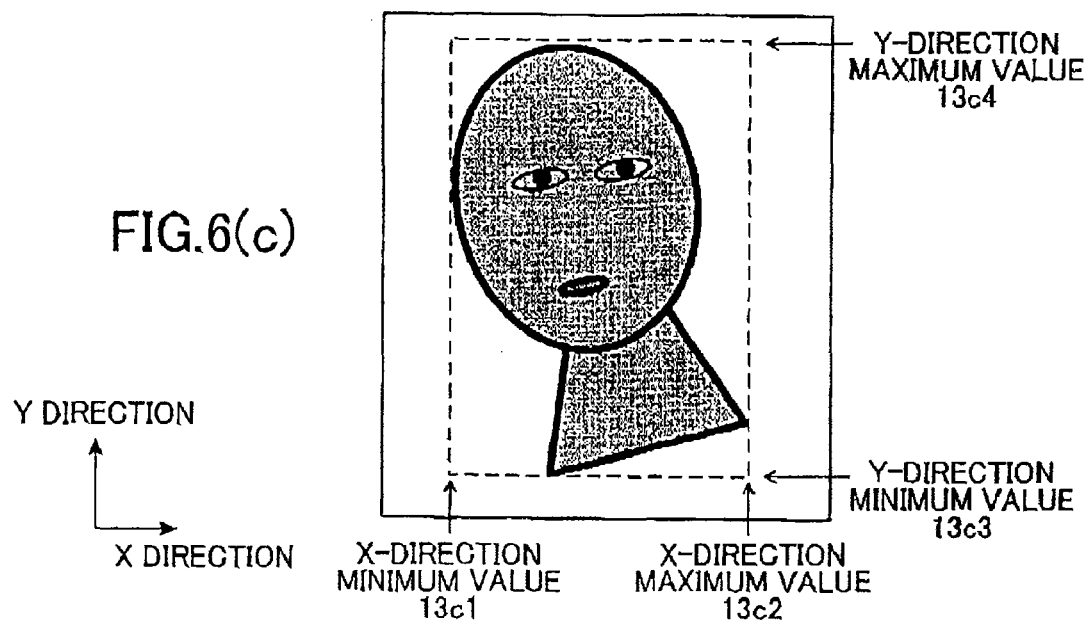

In the process shown in the flowchart of FIG. 4, the pixels having values included in the predetermined skin-color value ranges are extracted from the image data stored in the image memory 13a and stored in the skin-color image memory 13b. Referring to FIGS. 6(a)-6(c), a description is given for the image data extracted from the image memory 13a and stored in the skin-color image memory 13b, in the process shown in the flowchart of FIG. 4.

FIGS. 6(a)-6(c) conceptually illustrate the contents stored in the image memory 13a or the skin-color image memory 13b. FIG. 6(a) shows the case in which the image memory 13a stores image data. The image data stored in the image memory 13a is converted from the RGB system to the L*C*h system, and then stored in the skin-color image memory 13b. Next, as shown in FIG. 6(b), the skin-color image memory 13b maintains only the pixel values included in the predetermined skin-color value ranges. The other remaining pixel values are set to white. In FIGS. 6(b) and 6(c), though the border line defining the face is shown in black line for explanation, pixel values corresponding to the border line are actually set to white. FIG. 9(b) and FIG. 12(b) are shown in the same manner.

Referring back again to FIG. 3, after the CPU 11 ends the skin-color region extraction process (S1), in S2 the CPU 11 proceeds to a skin-color region determination process.

Figure 5:
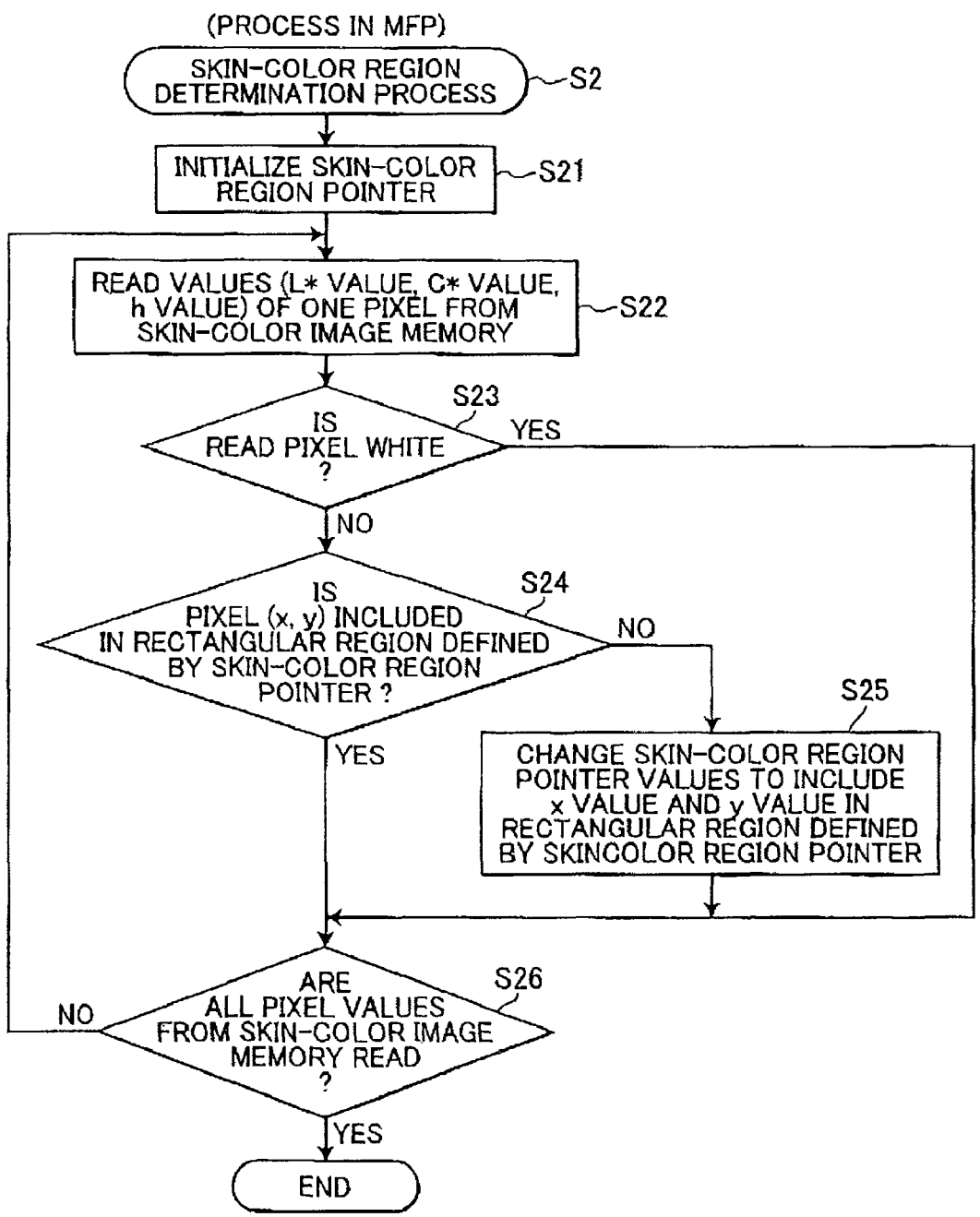
FIG. 5 is a flowchart showing a skin-color region determination process.

The skin-color region determination process (S2) is described with reference to FIG. 5. In the skin-color region determination process (S2), first, in S21 the CPU 11 initializes the skin-color region pointer 13c.

In S22 the CPU 11 reads values (L* value, C* value, h value) of one pixel from the skin-color image memory 13b. In S23 the CPU 11 determines whether or not the read pixel is white (100, 0, 0). If the read pixel is white (100, 0, 0) (S23: Yes), the CPU 11 proceeds to S26. On the other hand, if the read pixel is not white (S23: No), in S24 the CPU 11 determines whether or not the position of the read pixel (x, y) is included in the rectangular region defined by the skin-color region pointer 13c.

If the position of the read pixel (x, y) is not included in the rectangular region defined by the skin-color region pointer 13c in S24 (S24: No), in S25 the CPU 11 changes the values of the skin-color region pointer 13c so that the position of the read pixel defined by the x-value and the y-value is included in the rectangular region defined by the skin-color region pointer 13c, and the CPU 11 proceeds to S26. That is, in S25 the CPU 11 changes at least one of the X-direction minimum value 13c1, the X-direction maximum value 13c2, the Y-direction minimum value 13c3, and the Y-direction maximum value 13c4 to include the pixel (x, y) within the rectangular region defined thereby. On the other hand, if the read pixel is positioned within the rectangular region defined by the skin-color region pointer 13c (S24: Yes), the CPU 11 proceeds to S26 without changing the values of the skin-color region pointer 13c.

Because the skin-color region pointer 13c is initialized in S21, when the process of S24 is executed for the first time, the process of S24 makes a negative judgment, and the process of S25 is executed to set the X-direction minimum and maximum values 13c1 and 13c2 to the value of the X-coordinate of the read pixel (x, y) and to set the Y-direction minimum and maximum values 13c3 and 13c4 to the value of the Y-coordinate of the read pixel (x, y).

In S26 the CPU 11 determines whether or not all the pixel values are read from the skin-color image memory 13b. If all the pixel values are read (S26: Yes), the CPU 11 ends the process. On the other hand, if all the pixel values are not read from the skin-color image memory 13b (S26: No), the CPU 11 returns to S22 for repeating the process S22 to S25. In the process shown in the flowchart of FIG. 5, the CPU 11 can determine the rectangular region which encloses the image as shown in FIG. 6(c) (region defined by the dotted line) from the image (FIG. 6(b)) which is stored in the skin-color image memory 13b. The CPU 11 also can store the position information of the rectangular region in the skin-color region pointer 13c.

As shown in FIG. 3, after the CPU 11 ends the skin-color region determination process (S2), in S3 the CPU 11 proceeds to the n-th face determination process.

As shown in FIG. 7, in the n-th face determination process (S3), the CPU 11 performs a block information extraction process (S4), and a subsequent determination process (S5) in this order and ends the n-th face determination process.

FIG. 8 is a flowchart showing the block information extraction process (S4). In the block information extraction process (S4), first, in S31a the CPU 11 sets a block size by which the CPU 11 divides the rectangular region defined by the skin-color region pointer 13c (region defined by the dotted line of FIG. 6(c)) by referring to the table stored in the block size memory 12b. Specifically, the larger the value on the face determination counter n becomes, that is, the larger number of times the face determination processes (S3) are performed, the smaller the CPU 11 sets the block size. Thus, a larger number of times the face determination processes (S3) is performed, the higher accuracy a face determination can be performed, while a longer time is required. In other words, a smaller number of times the face determination process (S3) is performed, the shorter time a face determination can be performed, while the face determination is performed with a lower accuracy. In other word, if the face determination counter n is larger than "1", the CPU 11 sets a current block size smaller than the block size of the previous n-th face determination process.

Next, in S31 the CPU 11 divides the rectangular region defined by the skin-color region pointer 13c (region defined by the dotted line of FIG. 6(c)) into M-number of blocks in the vertical direction and N-number of blocks in the horizontal direction, as shown in FIG. 9(b), so that each block has the set size. Then, in S32 the CPU 11 initializes the block information memory 13d and the block determination flag memory 13e.

In S33, for one of the divided blocks, the CPU 11 obtains an average value of the pixels included in the block for each of L* value, C* value, and h value and stores each of the obtained values in the block information memory 13d. In S34, the CPU 11 determines whether or not each of the obtained average values (L* value, C* value, and h value) is included in the predetermined skin-color value range. If all the obtained average values are included in the predetermined skin-color value range (S34: Yes), in S35 the CPU 11 sets the determination flag of the block for which the average values have been obtained to "1(valid)". On the other hand, if any of the obtained average values are not included in the predetermined skin-color value range (S34: No), in S36 the CPU 11 sets the determination flag of the block for which the average values have been obtained to "0(invalid)".

In S37 the CPU 11 determines whether or not the average values are obtained for all the blocks. If the average values are obtained for all the blocks (S37: Yes), the CPU 11 ends the process. On the other hand, the average values are not obtained for all the blocks (S37: No), the CPU 11 returns to S33 for repeating the processes S33 to S36.

Thus, in the block information extraction process (S4), the rectangular region defined by the skin-color region pointer 13c (see FIG. 6(c)) is divided into the plurality of blocks as shown in FIG. 9(b). The values of each block are stored in the block information memory 13d. Thus, the CPU 11 can set the block determination flag which indicates whether or not the values of each block are included in the predetermined skin-color value range in the block determination flag memory 13e.

FIG. 9(b) conceptually illustrates the case in which the rectangular region defined by the skin-color region pointer 13c (see FIG. 6(c)) is divided into eight blocks in the vertical direction and four blocks in the horizontal direction, each of which has the same size. The vertical direction from top to bottom in FIG. 9(b) is referred to as a column direction, and the horizontal direction from left to right is referred to as a row direction. In FIG. 9(b), a reference point R is set at a top left position of the image. In the following description, a block (N, M) indicates a block that is located on N-th column and M-th row from the reference point R. That is, a number (N) is assigned to each column in an order from the reference point R in the row direction. Here, a first column from the reference point is assigned with 1. A number (M) is assigned to each row in an order from the reference point R in the column direction. Here, a first row from the reference point R is assigned with 1. For example, the block positioned at the top left is denoted as a block (1, 1). The block positioned at the bottom left is denoted as a block (1, 8).

As shown in FIG. 9(*b*), the marks "O" and "X" put in each block indicate whether or not the block has block values within the predetermined skin-color value range. If a block has "O" in FIG. 9(*b*), the block determination flag for this block is set to "1 (valid)". If a block has "X" in FIG. 9(*b*), the block determination flag for this block is set to "0 (invalid)". Hereinafter, the block whose block determination flag is set to "1 (valid)" is referred to as a "valid block", and the block whose block determination flag is set to "0 (invalid)" is referred to as an "invalid block".

Next, a description is given for the determination process (S5) to be performed after the block information extraction process (S4), as a part of the n-th face determination process (S3). FIG. 12(*a*) briefly illustrates the determination process (S5).

FIG. 12(*a*) shows the lightness-hue relation for each part on a human face skin. The horizontal axis shows hue h between red and yellow. When the hue h increases, the image becomes more yellowish. When the hue h decreases, the image becomes red. In other words, the horizontal axis indicates a part of hue circle from red to yellow. The vertical axis shows lightness L* between black and white. When the lightness L* increases, the image becomes white. When the lightness L* decreases, the image becomes black. As shown in FIG. 12(*a*), a human face skin is divided into the four parts "forehead", "undereye", "cheek", and "neck". Although the respective parts partly overlap one another in hue or lightness, specific characteristics are found when one part is compared with another part.

For example, the "undereye" skin is relatively high (white) in lightness and red in hue compared with the "forehead" skin. That is, the "undereye" skin is higher in lightness and more reddish in hue than the "forehead" skin. In other words, when difference value ΔL* is obtained by subtracting a lightness L* at "forehead" pixel from a lightness L* "undereye" pixel, ΔL* has a positive value. When difference value Δh is obtained by subtracting a hue h at "forehead" pixel from a hue h "undereye" pixel, Δh has a negative value.

The "cheek" skin is relatively high (white) in lightness and yellow in hue compared with the "undereye" skin. That is, the "cheek" skin is higher in lightness and more yellowish in hue than the "undereye" skin. In other words, when difference value ΔL* is obtained by subtracting a lightness L* at "undereye" pixel from a lightness L* "cheek" pixel, ΔL* has a positive value. When difference value Δh is obtained by subtracting a hue h at "undereye" pixel from a hue h "cheek" pixel, Δh has a positive value.

In addition, the "neck" skin is relatively low (black) in lightness and yellow in hue compared with the "cheek" skin. That is, the "neck" skin is lower in lightness and more yellowish in hue than "cheek" skin. In other words, when difference value ΔL* is obtained by subtracting a lightness L* at "cheek" pixel from a lightness at "neck" pixel, ΔL* has a negative value. When difference value Δh is obtained by subtracting a hue h at "cheek" pixel from a hue h "neck" pixel, Δh has a positive value.

In the face determination process, the CPU 11 checks relative change in hue and lightness of respective skin parts "forehead", "undereye", "undereye", "cheek" in this order. Since the relative change in hue and lightness is checked, a human face can be determined regardless of its skin color.

Figure 10:
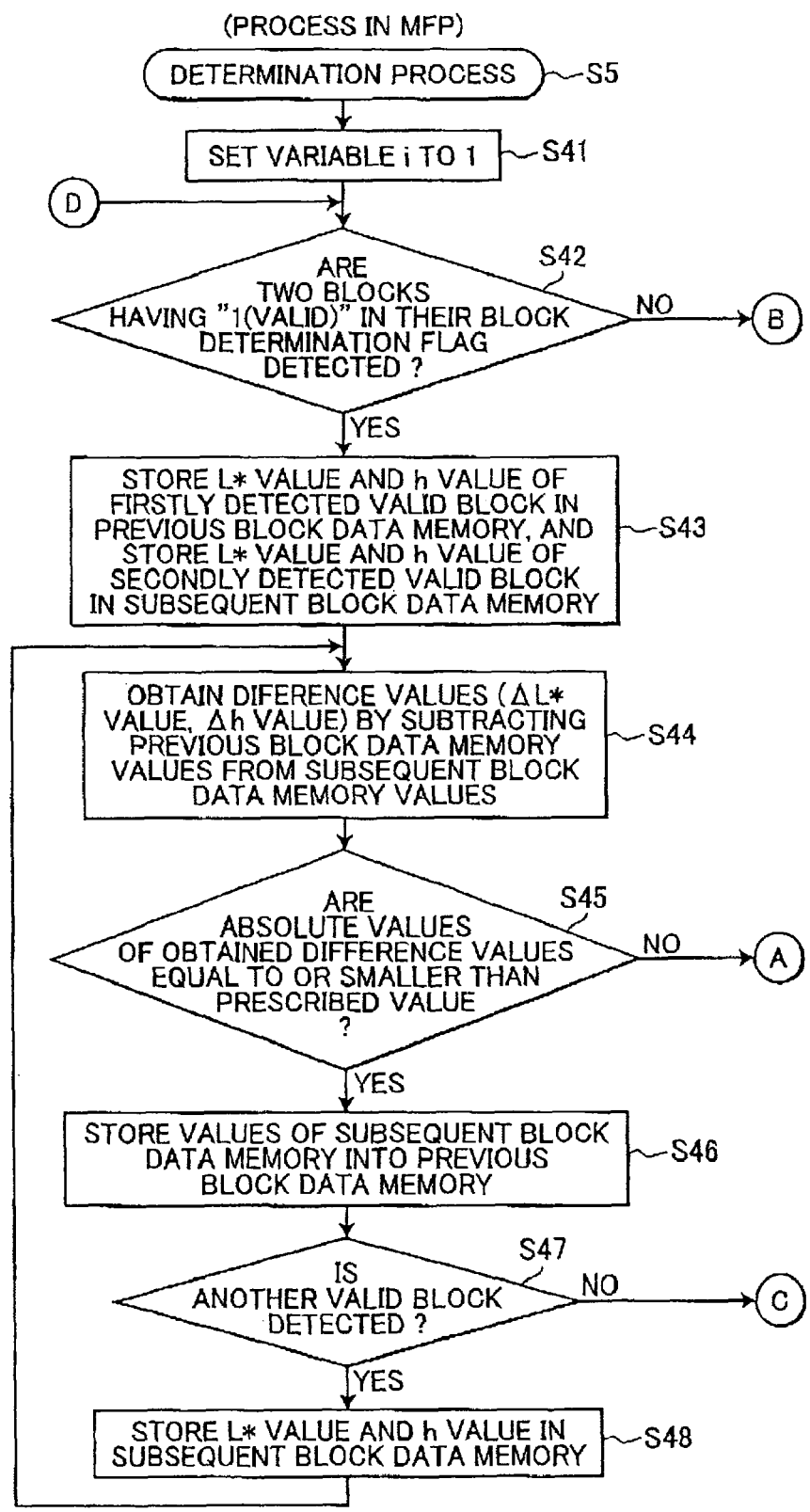
FIG. 10 is a flowchart showing a part of a determination process.

Referring to flowcharts of FIG. 10 and FIG. 11, the determination process (S5) is described. In the determination process, first, in S41 the CPU 11 sets a variable "i" to "1".

In S42 the CPU 11 scans the i-th column from the first row to the n-th row in the column direction and determines whether two blocks (valid blocks) having "1(valid)" are detected in their block determination flags. If the two valid blocks are detected (S42: Yes), in S43 the CPU 11 stores the block values (the L* value and the h value) of the firstly detected valid block in the previous block data memory 13*f* and the block values (the L* value and the h value) of the secondly detected valid block in the subsequent block data memory 13*g*.

In S44 the CPU 11 obtains difference values (ΔL* block value, Δh block value) by subtracting the values of the previous block data memory 13*f* from the values of the subsequent block data memory 13*g*. In S45, the CPU 11 determines whether or not the absolute values of the obtained difference values (ΔL* block value, Δh block value) are equal to or smaller than prescribed values. If any of the absolute values are not equal to or smaller than the prescribed values (S45: No), the CPU 11 proceeds to S49.

If the absolute values of the obtained difference values are equal to or smaller than the prescribed values (S45: Yes), it is known that the block values stored in the previous block data memory 13*f* belong to the same skin part of the subsequent block data memory 13*g*. For example, it is known that the block values stored in the previous block data memory 13*f*, and the block values stored in the subsequent block data memory 13*g* both belong to "forehead". In such a case, the CPU 11 does not proceeds to the detection process (S49) on the blocks belonging to same. As described below, in S54 and S60, the CPU 11 performs determination processes same as S45.

If all the absolute values of the obtained difference values are equal to or smaller than the predetermined values in S45 (S45: Yes), in S46 the CPU 11 stores the block values of the subsequent block data memory 13*g* in the previous block data memory 13*f*. Successively, in S47 the CPU 11 further scans the i-th column in the column direction and determines whether another valid block is detected. If another valid block is detected (S47: Yes), in S48 the CPU 11 stores the block values (the L* value and the h value) for the detected block in the subsequent block data memory 13*g*, and returns to S44. On the other hand, no other valid block is detected (S47: No), the CPU 11 proceeds to S63.

In S49 the CPU 11 determines whether or not the ΔL* value is a positive value, and whether or not the Δh value is a negative value. That is, the CPU 11 determines whether the difference (block) values ΔL* and Δh indicate the characteristics that the skin changes from "forehead" to "undereye". If the ΔL* value is positive and the Δh value is negative (S49: Yes), in S50 the CPU 11 stores the values of the subsequent block data memory 13*g* in the previous block data memory 13*f*. On the other hand, in any other case than the case where the ΔL* value is positive and the Δh value is negative (S49: No), the CPU 11 proceeds to S63.

Next, in S51 the CPU 11 further scans the i-th column in column direction and determines whether another valid block is detected. If the another valid block is detected (S51: Yes), in S52 the CPU 11 stores the L* value and the h value of the detected valid block in the subsequent block data memory 13*g*. On the other hand, if another valid block is not detected (S51: No), the CPU 11 proceeds to S63.

In S53 the CPU 11 obtains difference (block) values (ΔL* value and Δh value) by subtracting values of the previous block data memory 13*f* from the values of the subsequent block data memory 13g. In S54 the CPU 11 determines whether or not the absolute values of the obtained difference values are equal to or smaller than the prescribed value. If all the absolute values of the obtained difference values are equal to or smaller than the prescribed value (S54: Yes), the CPU 11 returns to S50 for repeating S50 to S53. On the other hand, if any of the absolute values of the obtained difference values are neither equal to nor smaller than (larger than) the prescribed value (S54: No), in S55 the CPU 11 determines whether both the ΔL* value and the Δh value are positive. That is, the CPU 11 determines whether the difference (block) value ΔL* and Δh indicate the characteristics that the skin changes from "undereye" to "cheek".

If both the ΔL* block value and the ah block value are positive (S55: Yes), the CPU 11 stores the values of the subsequent block data memory 13g in the previous block data memory 13f. On the other hand, in any case other than the case where both the ΔL* value and the Δh value are positive (S55: No), the CPU 11 proceeds to S63.

Successively, in S57 the CPU 11 further scans in i-th column in the column direction and determines whether another valid block is detected. If another valid block is detected (S57: Yes), in S58 the CPU 11 stores the L* value and the h value of the detected valid block in the subsequent block data memory 13g. On the other hand, if another valid block is not detected (S57; No), the CPU 11 proceeds to S63.

In S59 the CPU 11 obtains difference values (ΔL* block value and Δh block value) by subtracting values of the previous block data memory 13f from the values of the subsequent block data memory 13g. In S60 the CPU 11 determines whether or not the absolute values of the obtained difference (block) values are equal to or smaller than the prescribed value. If all the absolute values of the obtained difference values are equal to or smaller than the prescribed value (S60: Yes), the CPU 11 returns to S56 for repeating S56 to S59. On the other hand, if any one of the absolute values of the obtained difference values is neither equal to nor smaller than (longer than) the prescribed value (S60: No), in S61 the CPU 11 determines whether the ΔL* block value is negative and the Δh block value is positive. That is, the CPU 11 determines whether the difference (block) values ΔL* and Δh indicates the characteristics that the skin changes from "cheek" to "neck".

In S61, if the ΔL* value is negative and the Δh value is positive (S61: Yes), it is determined that the image data stored in the image memory 13a includes a human face image (S62). The CPU 11 ends the process. On the other hand, in any other case than the case where the ΔL* value is negative and the Δh value is positive (S61:No), the process skips to S63.

In S63 the CPU 11 determines whether or not a variable "i" is equal to N (column number of block). If the variable "i" is equal to the number N (S63: Yes), the CPU 11 ends the process. On the other hand, if the variable "i" is not equal to the number N (S63: No), in S64 the CPU 11 adds one to the variable "i". The CPU 11 returns to S42.

In the process S49-S61, the CPU 11 determines whether the block hue value changes in a from-yellow-to-red direction and then changes in a from-red-to-yellow direction in a hue circle according to shift in position of the block in the scanning direction (column direction), and whether the block lightness value increases and then decreases according to shift in position of the block in the scanning direction (column direction).

In the determination process (S5), the valid block values stored in the block information memory 13d are scanned in the scanning direction (column direction) on a column basis, so as to obtain the block difference values in succession. It is determined whether the obtained difference values have the characteristics indicating the change from the "forehead" part to the "undereye" part, the characteristics indicating the change from the "undereye" part to the "cheek" part, and the characteristics indicating the change from the "cheek" part to the "neck" part. Thus, the CPU 11 can determine whether a face image is included.

Referring next to FIG. 12(b), a description is given for how the block values of valid blocks are compared, as an example. FIG. 12(b) conceptually illustrates valid blocks and the scanning direction.

As shown in FIG. 12(b), valid blocks are scanned from the first row ("i"=1) in the scanning direction (column direction) toward eighth row ("i"=8). For example, as the third column is scanned in the scanning direction, a block (3, 2) and a block (3, 4) are detected. The difference values between the detected blocks have the characteristics indicating the change from the "forehead" part to the "undereye" part. Scanning is performed on the following blocks. Then, a block (3, 5) is detected. The difference values between the values of the block (3, 4) and the block (3, 5) are obtained by comparison. The difference values have the characteristics indicating the change from the "undereye" part to the "cheek" part. Scanning is performed on the following blocks. Then, a block (3, 6) is detected. The difference values between the values of the block (3, 5) and the block (3, 6) are obtained by comparison. Although the block (3, 6) includes both the skin types "cheek" and "neck", the difference values between the block (3, 5) and the block (3, 6) have the characteristics indicating the change from the "cheek" part to the "neck" part. Thus, it is determined that the image includes a human face image.

As shown in FIG. 3, after the CPU 11 ends the n-th face determination process (S3) described above, in S311 the CPU 11 determines whether or not any face image is detected in the n-th face determination process (S3). If a face image is detected (S311.Yes), in S312 the CPU 11 performs correction on the detected face image according to the instruction given by the user in S308 based on the corresponding correction program stored in the control program region 12a.

In S313 the CPU 11 controls the LCD 16 to display the corrected face image, with a message asking whether or not the next face determination process is to be performed. The user checks the corrected face image displayed in S313. If the user is satisfied with the corrected face image, the user determines that the next face determination process is not to be performed. If the user is not satisfied with the corrected face image, the user determines that the next face determination process is to be performed.

On the other hand, if face image is not detected in the n-th face determination process (S3) (S311: No), in S314 the CPU 11 controls the LCD 16 to display a message saying that no face image has been detected, and asking whether or not the next face determination process is to be performed. If the user is satisfied with the message displayed in S311, the user determines that the next face determination process is not to be performed. If the user is not satisfied with the massage, the user determines that the next face determination process is to be performed.

The user determines whether or not the next face determination process is to be performed, and then inputs the determination. In S315 the CPU 11 determines whether the user decides to perform the next face determination process. If the next face determination process is not to be performed (S315: No), the CPU 11 ends the process. On the other hand, if the next face determination process is to be performed (S315;

Yes), in S316 the CPU 11 adds one to the face determination counter n. The new n-th face determination process (S3) is then performed again.

In the subsequent n-th face determination process (S3) to be performed at this time, the block size in which the rectangular region defined by the skin-color region pointer is to be divided, is set to be smaller, compared with the case where the n-th face determination process (S3) which has been previously performed. Specifically, the rectangular region defined by the skin-color region pointer is divided into a larger number of blocks in the subsequent n-th face determination process (S3), compared with the previous n-th face determination process (S3).

The subsequent n-th face determination process (S3) requires a longer time but completes the face determination process with a higher accuracy, compared with the previous n-th face determination process (S3). The face image which has not been detected in the previous n-th face determination process (S3), can possibly be detected in the subsequent n-th face determination process (S3). Accordingly the subsequent face determination process have an advantage for the user who wants a face image detection with a higher accuracy even with a longer time. On the other hand, if the user is satisfied with the result determined in the previous n-th face determination process (S3), that is the user does not need the face image detection with a higher accuracy, a face image detection is thus performed, within the accuracy range requested by the user and within a shorter time.

While the invention has been described in detail with reference to the above embodiment thereof, it would be apparent to those skilled in the art that various changes and modifications may be made therein without departing from the spirit of the invention.

In the above embodiment, in order to detect a face image with a higher accuracy in a longer time as the number of determination processes increases a face image is detected with a higher accuracy in a longer time by making the block size smaller as the number of determination processes increases. However, the invention is not limited to the above-described method. For example, an image may be pattern-matched with templates, with the number of templates increasing as the number of determination processes increases. Also in this case, a face image can be detected with a higher accuracy in a longer time, as the number of determination processes increases.

In the above embodiment, the block size, which becomes smaller as the number of determination processes increases, is stored in the block size memory of the ROM 12 as a prescribed value in advance. However, the user may arbitrarily set a rate, at which the block size is reduced as the number of determination processes increases.

In the above embodiment, blocks are scanned in the vertical direction (column direction). However, blocks may be scanned horizontally or obliquely if the image is tilted. The difference values between the valid block values can be obtained even when scanning is obliquely performed. That is, the rectangular region defined by the skin-color region pointer 13c is scanned along a straight line and the blocks in the rectangular region are compared. This straight line may be a vertical line, a horizontal line, or a tilted line. Therefore, even when an image is tilted, a human face image can be detected therein.

In the above embodiment, the description is given for the face image which includes all whole face. However, the CPU 11 can detect a part of face image that includes "forehead", "undereye", "cheek", and "neck" parts according to the process described above.

In the above embodiment, every time the n-th face determination process is performed, in S313 or S314 the CPU 11 controls the LCD 16 to display a result of the n-th face determination process and asking whether or not the next face determination process is to be performed. However, after the plurality of n-th face determination process is performed, the CPU 11 may control the LCD 16 to display a result of the n-th face determination processes and asking whether or not the next face determination process is to be performed.

In the above embodiment, in 31a the CPU 11 sets a block size smaller than the previously set block size every time when the n-th face determination process is repeated. However, the CPU 11 may set a block size smaller than the previously set block size after the plurality of n-th face determination process is performed. That is, the CPU 11 performs the plurality of n-th face determination by the same block size. The detection rate of the face image is improved by repeating the n-th face determination process in the same block size of the previous n-th face determination process.

In the above embodiment, the MFP 1 performs image processing on image data. However, a PC hard disk may store a program for performing the image processing according to the above embodiment, and the PC may perform image processing on image data.

What is claimed is:

1. A face detection device for detecting a human face image in an image, the face detection device comprising:
   a face determining unit that performs a face determination process, in the face determination process the face determining unit determining whether the image includes a human face image indicative of at least a part of a human face;
   a control unit that performs a base process by controlling the face determining unit to perform the face determination process at least one time;
   a display unit that displays a result of the base process;
   a receiving unit configured to receive an instruction indicating that an additional process is instructed by a user;
   a pixel information creating unit that creates pixel information of each pixel in the image;
   an extracting unit that extracts a region including a pixel having human skin characteristics from the image based on the pixel information,
   wherein the face determining unit comprising:
      a setting unit that sets a block size;
      a dividing unit that divides a region extracted by the extracting unit into blocks having the block size, each block having at least one pixel;
      a block information forming unit that forms block information for each block based on the pixel information of at least one pixel in the each block; and
      an information determining unit that determines whether a changing state, indicative of how the block information changes according to shift in position of the block in one direction in the region, satisfies a prescribed condition; and
   a determining unit that determines that the region includes a human face image when the information determining unit determines that the changing state satisfies the prescribed condition,
   wherein when the receiving unit receives the instruction, the control unit performs the additional process by controlling the face determining unit to perform the face determination process at least one time on the same image with a higher accuracy than the face determination process in the base process.

2. The face detection device as claimed in claim 1, further comprising:
- a method selecting unit that selects a correction method based on a user input;
- a correcting unit that corrects the human face image that is determined by the face determining unit based on the correction method selected by the method selecting unit;
- wherein the display unit displays the human face image corrected by the correcting unit.

3. The face detection device as claimed in claim 2, wherein the setting unit decreases the block size as the number of determination processes increases.

4. The face detection device as claimed in claim 1, wherein the pixel information for each pixel includes a pixel hue value and the block information for each block includes a block hue value determined based on the pixel hue value of the at least one pixel in the block,
- wherein the information determining unit determines whether a changing state, indicative of how the block hue value changes according to shift in position of the block in one direction in the region, satisfies a prescribed condition, and
- wherein the prescribed condition indicates that the block hue value changes in a from-yellow-to-red direction and then changes in a from-red-to-yellow direction in a hue circle.

5. The face detection device as claimed in claim 1, wherein the pixel information for each pixel includes a pixel lightness value and the block information for each block includes a block lightness value determined based on the pixel lightness of the at least one pixel in the block,
- wherein the information determining unit determines whether a changing state, indicative of how the block lightness value changes according to shift in position of the block in one direction in the region, satisfies a prescribed condition, and
- wherein the prescribed condition indicates that the block lightness value increases and then decreases.

6. The face detection device as claimed in claim 1, wherein the pixel information for each pixel includes a pixel hue value and a pixel lightness value and the block information for each block includes a block hue value determined based on the pixel hue value of the at least one pixel in the block and a block lightness value determined based on the pixel lightness value of the at least one pixel in the block,
- wherein the information determining unit determines whether a changing state, indicative of how the block hue value changes according to shift in position of the block in one direction in the region, satisfies a prescribed condition and whether another changing state, indicative of how the block lightness value changes according to shift in position of the block in one direction in the region, satisfies another prescribed condition, and
- wherein the prescribed condition indicates that the block hue value changes in a from-yellow-to-red direction and then changes in a from-red-to-yellow direction in a hue circle and the another prescribed condition indicates that the block lightness value increases and then decreases.

7. The face detection device as claimed in claim 6, wherein the block hue value for each block is obtained by averaging the pixel hue value for the at least one pixel in the block, and a block lightness value for each block is obtained by averaging the pixel lightness value for the at least one pixel in the block.

8. The face detection device as claimed in claim 1 wherein the pixel information includes a pixel value, and the block information includes a block value determined based on the pixel values of the at least one pixel in the block;
- the information determining unit determines the changing state by determining a difference in the block values for two blocks, the two blocks including one block and the other block that is disposed on a downstream side relative to the one block in the one direction.

9. The face detection device as claimed in claim 1 wherein the image extends in a first direction and a second direction orthogonal to the first direction,
- the dividing unit divides the region with respect to the first direction and the second direction, and
- the information determining unit defines the changing state in the one direction extending parallel to the first direction.

10. The face detection device as claimed in claim 1, wherein the display unit displays a result of the additional process after the control unit performs the additional process,
- wherein the receiving unit is configured to receive another instruction for the face determination process after the display unit displays the result of the additional process,
- wherein each time after the receiving unit receives the another instruction, the control unit performs the additional process by controlling the face determining unit to perform the face determination process with a higher accuracy than the face determination process in the additional process that has been previously performed.

11. A face detection method for detecting a human face image in an image, the face detection method comprising:
- performing a base process by performing the face determination process at least one time, the face determination process comprising determining whether the image includes a human face image indicative of at least a part of a human face;
- displaying a result of the performing of the base process;
- receiving an instruction indicating an additional process is instructed by a user;
- creating pixel information of each pixel in the image;
- extracting a region including a pixel having human skin characteristics from the image based on the pixel information,
- wherein the face determination process comprises the steps of:
  - setting a block size;
  - dividing a region extracted by the extracting unit into blocks having the block size, each block having at least one pixel;
  - forming block information for each block based on the pixel information of at least one pixel in the each block; and
  - determining whether a changing state, indicative of how the block information changes according to shift in position of the block in one direction in the region, satisfies a prescribed condition; and
- determining that the region includes a human face image when it is determined that the changing state satisfies the prescribed condition, wherein
- after the receiving of the instruction, performing the additional process by performing the face determination process at least one time on the same image with a higher accuracy than the performing in the base process.

12. A non-transitory computer-readable storage medium storing a set of program instructions executable on a face detection device, the program instructions comprising:
- performing a base process by performing the face determination process at least one time, the face determination process comprising determining whether the image includes a human face image indicative of at least a part of a human face;

displaying a result of the performing of the base process;

receiving an instruction indicating an additional process is instructed by a user;

creating pixel information of each pixel in the image;

extracting a region including a pixel having human skin characteristics from the image based on the pixel information, wherein the face determination process comprises the steps of:
   setting a block size;
   dividing a region extracted by the extracting unit into blocks having the block size, each block having at least one pixel;
   forming block information for each block based on the pixel information of at least one pixel in the each block; and
   determining whether a changing state, indicative of how the block information changes according to shift in position of the block in one direction in the region, satisfies a prescribed condition; and
determining that the region includes a human face image when it is determined that the changing state satisfies the prescribed condition, wherein
after the receiving of the instruction, performing the additional process by performing the face determination process at least one time on the same image with a higher accuracy than the performing in the base process.

* * * * *